United States Patent
Hoshi

(10) Patent No.: US 8,416,702 B2
(45) Date of Patent: Apr. 9, 2013

(54) NETWORK SWITCH, PATH SETTING METHOD, AND PROGRAM

(75) Inventor: Noritaka Hoshi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 12/864,567

(22) PCT Filed: Dec. 11, 2008

(86) PCT No.: PCT/JP2008/072511
§ 371 (c)(1),
(2), (4) Date: Jul. 26, 2010

(87) PCT Pub. No.: WO2009/098820
PCT Pub. Date: Aug. 13, 2009

(65) Prior Publication Data
US 2010/0302952 A1    Dec. 2, 2010

(30) Foreign Application Priority Data
Feb. 8, 2008  (JP) ................................ 2008-028890

(51) Int. Cl.
*H04L 12/28* (2006.01)
(52) U.S. Cl. ........................................ 370/250; 370/254
(58) Field of Classification Search .................. 370/254
See application file for complete search history.

(56) References Cited

U.S. PATENT DOCUMENTS
6,243,361 B1 *  6/2001  McMillen et al. ............ 370/254

FOREIGN PATENT DOCUMENTS

| | | |
|---|---|---|
| JP | 5-28122 A | 2/1993 |
| JP | 7-200486 A | 8/1995 |
| JP | 8-305649 A | 11/1996 |
| JP | 2581286 B | 2/1997 |
| JP | 9-297746 A | 11/1997 |
| JP | 2000216787 A | 8/2000 |
| JP | 2004533035 A | 10/2004 |
| JP | 2005051548 A | 2/2005 |
| JP | 2005136502 A | 5/2005 |
| JP | 2006014187 A | 1/2006 |

OTHER PUBLICATIONS

International Search Report for PCT/JP2008/072511 mailed Jan. 20, 2009.
M. Nakazawa et al., "An implementation and Its Evaluation of Application Layer Multicast Distribution Tree Based on Associatively and Stability", Transactions of Information Processing Society of Japan, vol. 47, No. 2, IPSJ Journal, Feb. 15, 2006, pp. 382-391.

* cited by examiner

*Primary Examiner* — Huy D Vu
*Assistant Examiner* — Joseph Bednash

(57) ABSTRACT

A transfer path of a multicast packet is set to an output port, from among a plurality of outputs each associated with a plurality of input ports, which is specified to output the multicast packet. The number of completed path setting processes which is the number of processes for which path setting has been completed, is counted. It is determined whether or not the number of completed processes counted is identical with the number of processes for executing the multicast communication. When it is determined that the numbers are identical with each other, it is recognized that the transfer path setting of the multicast communication has been completed.

17 Claims, 10 Drawing Sheets path setting command

| multicast ID | 1 |
|---|---|
| multicast control switch number | network switch21-1 |
| number of processes belonging to group | 5 |

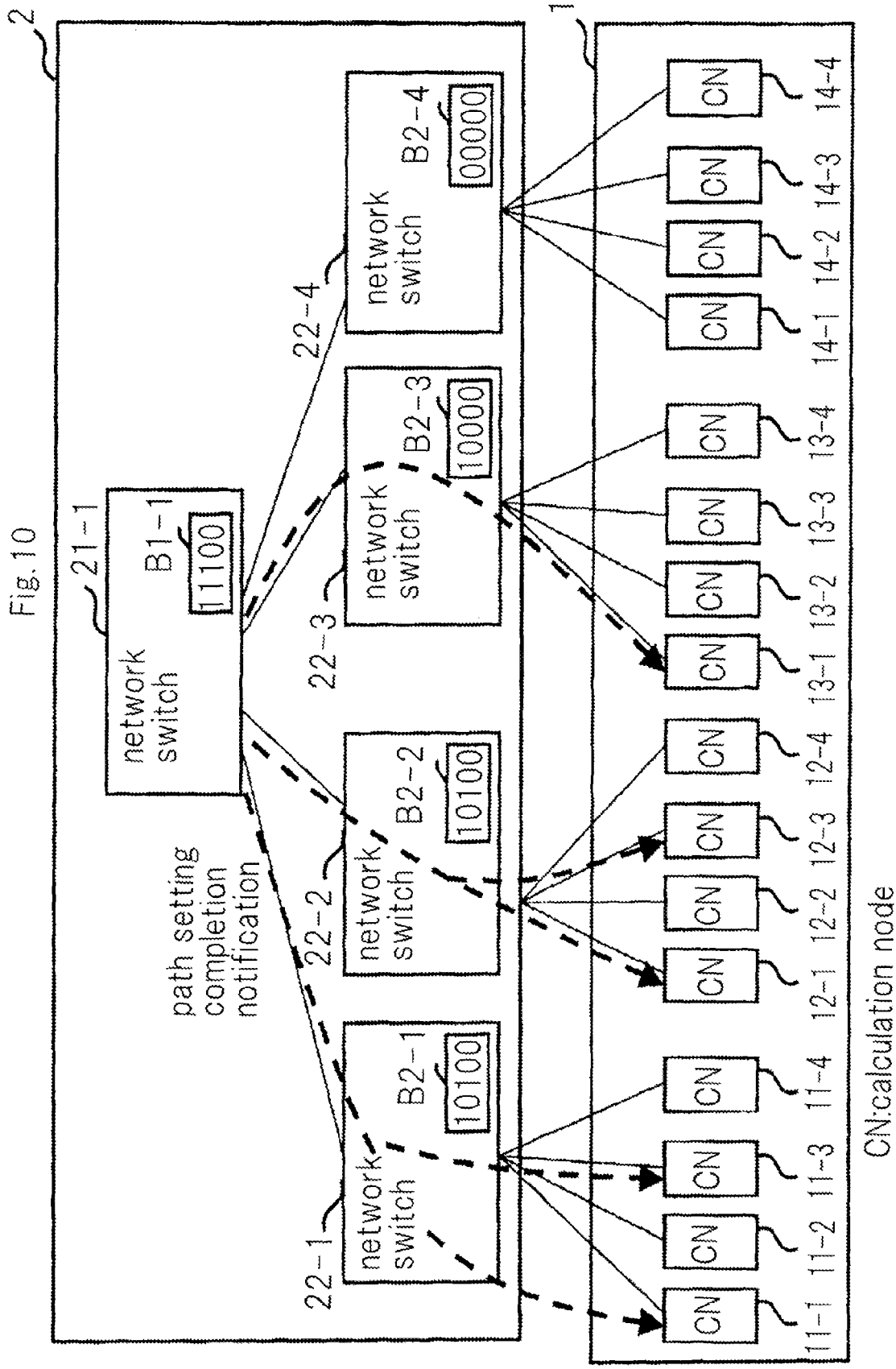

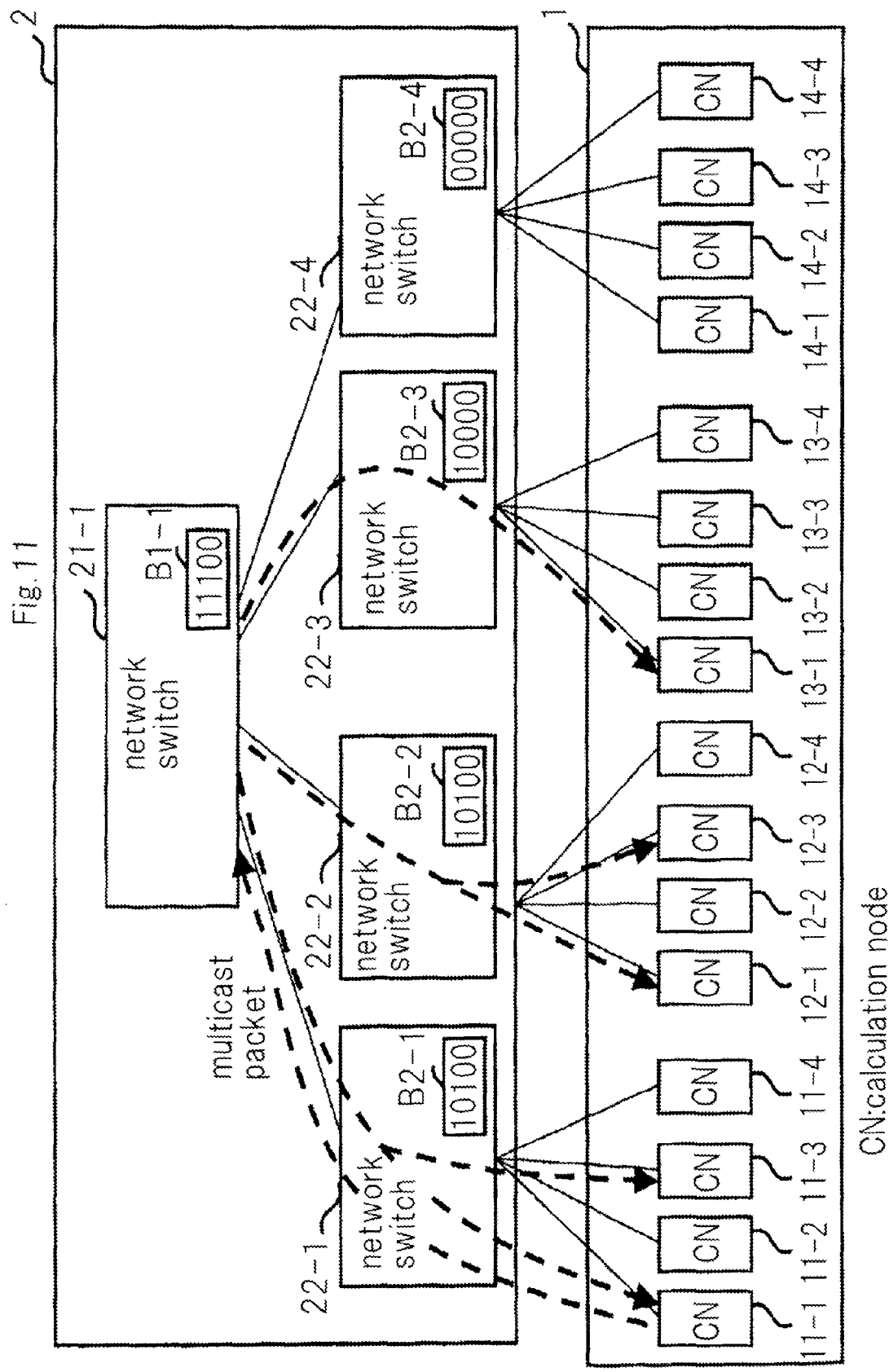

NETWORK SWITCH, PATH SETTING METHOD, AND PROGRAM

TECHNICAL FIELD

The present invention relates to a network switch, a path setting method, and a program that form an interconnection network for mutually connecting computers. More specifically, the present invention relates to a capability of setting path information for suitably routing packets of multicast communication to simultaneously distribute data to specified computers and to a capability of executing the multicast communication based on the set path information.

BACKGROUND ART

In general, a parallel computer system in which a plurality of calculation nodes are connected via an interconnection network is used to quickly process large-scale issues. In the parallel computer system, a target issue is divided for processing by the calculation nodes. In that case, the calculation nodes need to mutually transfer data necessary for computation and data of the computation result. To this end, data transfer from one calculation node to another calculation node is performed via the interconnection network.

When packets containing the same data are transmitted from one calculation node to a plurality of calculation nodes, the intended object can be attained if the calculation node of the transfer source transmits the packets to the calculation nodes at different transfer destinations. However, if the interconnection network has a capability of duplicating packets subject to data transfer and transmitting the packets to the calculation nodes, the load on the interconnection network applied by the calculation node of the transfer source is reduced, so that time required for the data transfer can be reduced. The capability of transmitting the same data from one calculation node to a plurality of calculation nodes is called a multicast communication capability.

In MPI (Message Passing Interface) known as a general method for describing a program to be executed on parallel computers, a set of processes for performing intercommunication is managed as communicators, and functions for performing multicast communication to the processes included in the communicators are prepared.

For example, "MPI_Bcast" defined by MPI is a function for sending data retained by a process to all processes included in the same communicators. The communicators specify a set of the entire processes in the system in some cases and specify a subset of the processes in other cases. "MPI_Allgather" is a function for sending, from one of the processes in a communicator, specified data to all processes included in the communicator.

The capabilities of the functions for performing the multicast communication, such as "MPI_Bcast" and "MPI_Allgather" can also be realized by executing unicast communication, which is one-to-one communication, a plurality of times. However, when the interconnection network has a capability of duplicating the packets and transmitting the packets to the calculation nodes, it is desirable to utilize the capability that the interconnection network has. This is because the data transfer time is reduced and thus the execution performance of the entire program can be improved.

Various techniques for reducing the data transfer time and improving the execution performance of the entire program are proposed.

For example, as disclosed in JP1996-305649A, a multicast method is contemplated in which a buffer for multicast is provided in a general interchange switch, and if no output port is available at the transmission of a multicast packet, a multicast packet to be transmitted is stored in the buffer for multicast until one of the output ports can be used.

Furthermore, a technique is proposed in which data transfer is executed by specifying a computer in a system, which is the transfer destination of data, when multicast communication is performed.

For example, as disclosed in Japanese Patent No. 2581286, a network control method is contemplated in which packets are transferred to a calculation node, the node number of which is within a range that is specified by a minimum value and a maximum value of destination node numbers.

Furthermore, as disclosed in Japanese published translations of PCT international application No. 2004-533035, a class/network path designation method is contemplated in which a message is subjected to multicast transfer to calculation nodes arranged in the same row or to calculation nodes arranged in the same column in a network in which the calculation nodes are arranged in a lattice pattern.

Furthermore, as disclosed in JP2000-216787A, a parallel computer is contemplated in which destinations are encoded into respective packets and described in a fixed-length field on the header. In the parallel computer, the destinations are specified with the small numbers of destination bits, and multicast packets are generated when the data length for specifying the destination exceeds the fixed-length field.

Furthermore, as disclosed in JP 1993-028122A, a broadcast method is contemplated in which a network switch retains path information, and multicast transfer is performed according to the path information. In this broadcast method, an external program calculates the path information in advance, and the calculated path information is set.

Yet furthermore, as disclosed in JP1997-297746A, an interprocessor communication method is contemplated in which address registers that can be set from a program are provided in receiving apparatuses, the headers of packets are used to select the address registers for the reception destinations (destination processors) of the multicast packets, and the addresses of the reception destinations are written to the register values of the selected address registers.

In the multicast communication, transfer destinations and transfer paths corresponding to the transfer destinations need to be specified. In general techniques, there is a problem in which complicated destination patterns may not be able to be described or in which the destination patterns may not be able to be described until the physical location of a calculation node that executes processes is specified.

The general techniques described above suffer from the following problems.

The techniques disclosed in Japanese Patent No. 2581286 and Japanese published translations of PCT international application No. 2004-533035 are problematic in that the since the destination nodes of the multicast communication are closely related to the physical arrangement of the calculation nodes on the interconnection network, the patterns for specifying the destination nodes may be limited.

The technique disclosed in JP2000-216787A is problematic in that when the patterns of the destination nodes of the multicast communication are complicated and are difficult to be encoded to a fixed-length bit sequence, the effects that the multicast capability has may be reduced because a plurality of multicast communications are executed.

The technique disclosed in JP1993-028122A is problematic in that since the path information for path designation is set in advance by an external program, the path cannot be specified when the multicast communication is executed from a user computer, so that it must be determined prior to the execution of the multicast communication on which calculation node the processes are run, thus making a flexible, efficient system operation difficult.

Furthermore, in the techniques disclosed in the above patent documents, when the numbers of the calculation nodes are virtualized or when the calculation nodes for operating the processes cannot be identified in advance when the program is run, destinations of the multicast communication need to be first specified after the physical locations of the calculation nodes are specified, when the multicast communication is executed. Therefore, the techniques disclosed in the patent documents present a common problem in which the time required to specify the path becomes overhead in the program execution.

DISCLOSURE OF THE INVENTION

It is an object of the present invention is to provide a network switch, a path setting method, and a program that solves the aforementioned problems.

To solve the problems, the present invention provides a network switch that comprises a plurality of input ports and a plurality of output ports each associated with the respective input ports, wherein a multicast packet is output from an output port, and that is characterized by a multicast control information retaining section that specifies, from among said output ports, an output port from which the multicast packet is output; a multicast controller that performs transfer path setting for setting a transfer path of the multicast packet to the output port that is specified by said multicast control information retaining section; an adder section that counts the number of completed path setting processes which is the number of processes for which said multicast controller has completed the transfer path setting; and a comparator section that determines whether or not the number of completed processes counted by said adder section is identical with the number of processes for executing the multicast communication, and that when it is determined that the numbers are identical with each other, recognizes that the transfer path setting of the multicast communication has been completed.

To solve the problems, the present invention provides a path setting method in a network switch that comprises a plurality of input ports and a plurality of output ports each associated with the respective input ports, wherein a multicast packet is output from an output port, the method comprises a multicast control information retaining process that specifies, from among said output ports, an output port from which the multicast packet is output; a multicast control process that performs transfer path setting for setting a transfer path of the multicast packet to the output port that is specified by said multicast control information retaining process; an addition process that counts the number of completed path setting processes which is the number of processes for which said multicast control process has completed the transfer path setting; and a comparison process that determines whether or not the number of completed processes counted by said addition process is identical with the number of processes for executing the multicast communication, and that when it is determined that the numbers are identical with each other, recognizes that the transfer path setting of the multicast communication has been completed.

Also, there is provided is a program for causing a computer to perform: a multicast control information retaining procedure that specifies, from among output ports each associated with the respective input ports that are possessed by a network switch, an output port from which the multicast packet is output; a multicast control procedure that performs transfer path setting for setting a transfer path of the multicast packet to the output port that is specified by said multicast control information retaining procedure; an addition procedure that counts the number of completed path setting processes which is the number of processes for which said multicast controller has completed the transfer path setting; and a comparison procedure that determines whether or not the number of completed processes counted by said addition procedure is identical with the number of processes for executing the multicast communication, and that when it is determined that the numbers are identical with each other, recognizes that the transfer path setting of the multicast communication has been completed.

According to the present invention, in a network switch comprising a plurality of input ports and a plurality of output ports each associated with the respective input ports, wherein a multicast packet is output from an output port, an output port from which the multicast packet is output is specified from among the output ports; a transfer path of the multicast packet is set to the specified output port; the number of completed path setting processes which is the number of processes for which the transfer path setting is completed is counted; it is determined whether the counted number of completed path setting processes is identical with the number of processes for executing the multicast communication; and when it is determined that the numbers are identical with each other, it is recognized that the transfer path setting of the multicast communication has been completed: Therefore, the destination and the transfer path in the multicast communication can be quickly set.

BRIEF DESCRIPTION OF THE DRAWINGS

FIG. 10 is a diagram showing a flow of data between the constituent elements in a "path setting completion notification process" of the parallel computer system.

FIG. 11 is a diagram showing a flow of data between the constituent elements in a "multicast communication process" of the parallel computer system.

BEST MODE FOR CARRYING OUT THE INVENTION

A parallel computer system (including a network switch, a path setting method, and a program) according to an exemplary embodiment will be hereinafter described.

Figure 1:
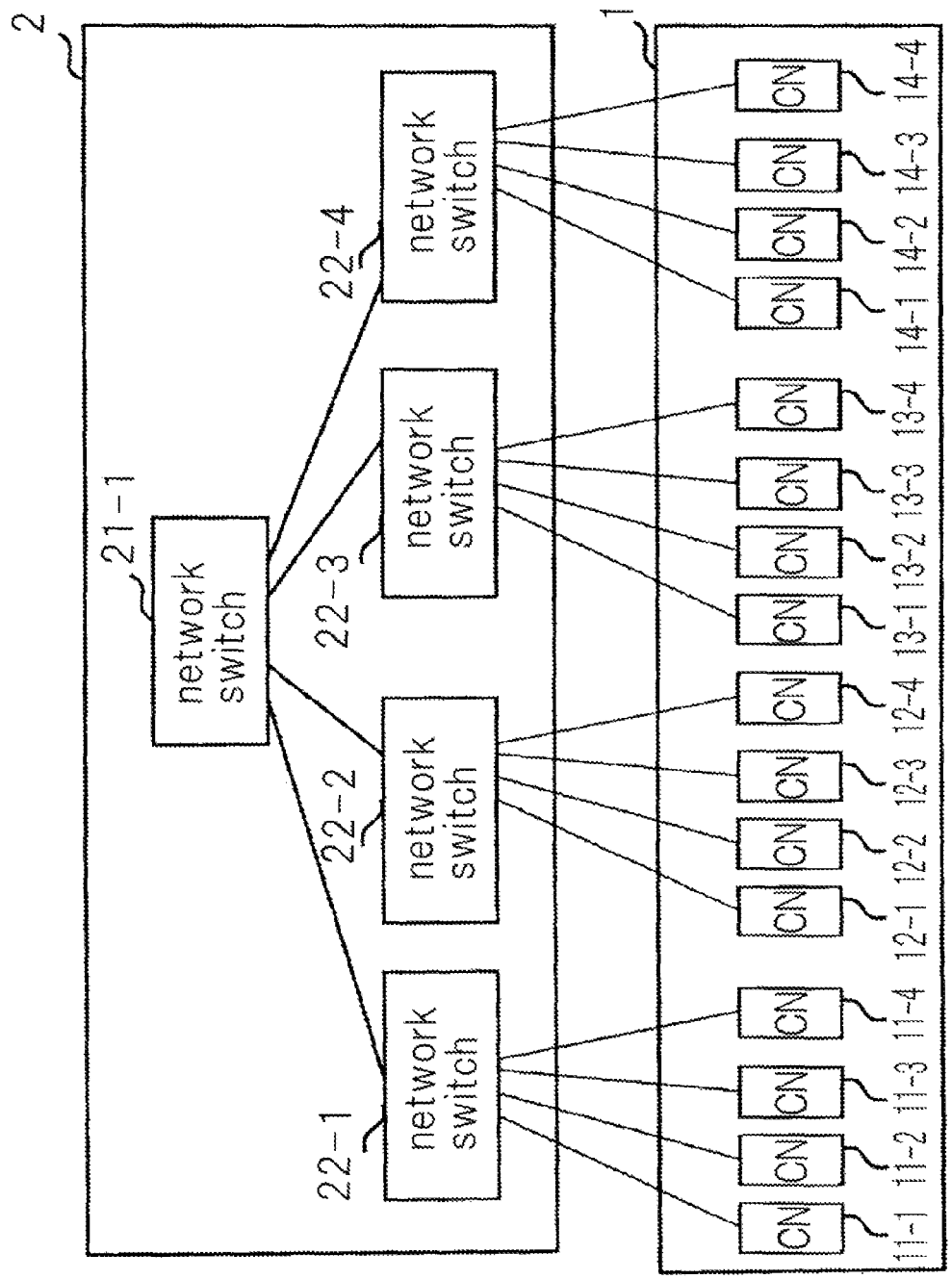
FIG. 1 is a diagram showing the configuration of a parallel computer system according to an exemplary embodiment of the present invention.

First, the configuration of the parallel computer system of the exemplary embodiment will be described. As shown in FIG. 1, the parallel computer system comprises calculation node group 1 and interconnection network 2. Calculation nodes 11-1 to 11-4, 12-1 to 12-4, 13-1 to 13-4, and 14-1 to 14-4 (hereinafter referred to as "calculation node 10") included in calculation node group 1 are connected to interconnection network 2. The network configuration of interconnection network 2 is not particularly limited and may be, for example, a network such as a multistage connection network. In the example below, a tree-type network will be described.

Calculation nodes 10 are computers independent from each other, each including a computing unit and a memory. Calculation nodes 10 mutually-transfer data through interconnection network 2 as necessary, and execute predetermined processes. Calculation nodes 10 have the capabilities of executing a "path setting command issuing process" and of issuing a "path setting command" described below. Calculation nodes 10 also have the capability of issuing multicast packets to be transmitted to specific destinations through multicast communication. Although the form of the multicast packets is not particularly limited, it is assumed that the multicast packets of the exemplary embodiment include "controller arrival bits" indicative of whether or not the multicast packets have reached a multicast control switch described below.

Interconnection network 2 is comprised of plural network switches. Network switches 22-1 to 22-4 (hereinafter also referred to as "network switches 22") are directly connected to calculation node group 1.

Network switch 21-1 mutually connects network switches 22-1 to 22-4. For example, when data is transferred from calculation node 11-1 to calculation node 11-2, the data is transferred through network switch 22-1. Data transfer from calculation node 11-1 to calculation node 13-1 is performed sequentially through network switches 22-1, 21-1, and 22-3. Although the number of network switch 21-1 is "1" in the exemplary embodiment, there may be a plurality of network switches 21-1. For this reason, in the following, network switches provided at the same hierarchical level as network switch 21-1 on interconnection network 2 will be collectively referred to as "network switch 21"

Figure 2:
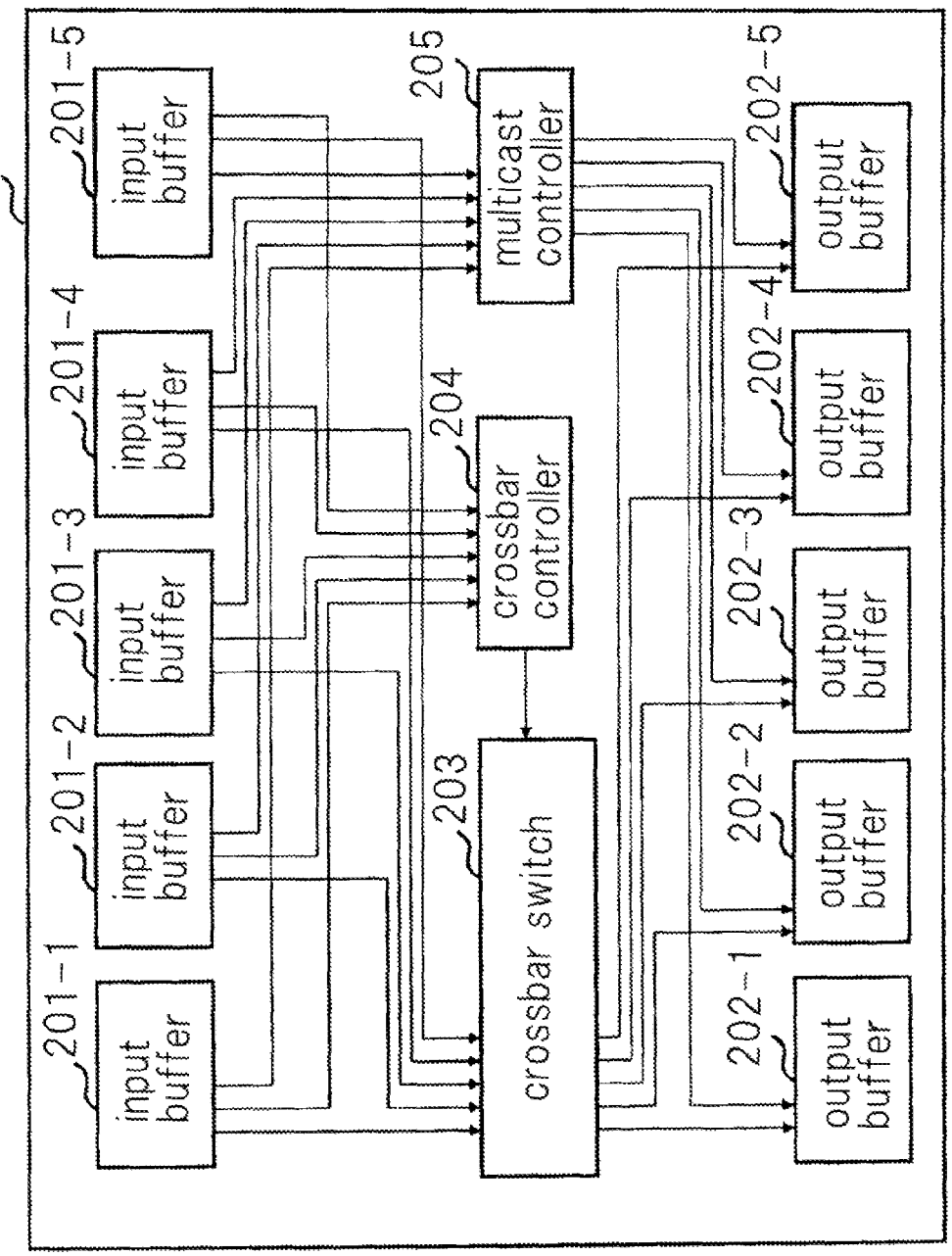
FIG. 2 is a diagram showing the configuration of a network switch shown in FIG. 1.

Next, the configurations of network switches 21-1 and 22-1 to 22-4 in the exemplary embodiment will be described. As shown in FIG. 2, network switches 21-1 and 22-1 to 22-4 each comprise a crossbar switches in which the number of input ports is five, and the number of output ports is five (hereinafter "five inputs five outputs").

As shown in FIG. 1, in network switch 21-1, four input ports are used and four output ports are used (hereinafter called "4 inputs 4 outputs"), and the fifth input port and the fifth output port are not used. In the example of the exemplary embodiment, the input ports and the output ports included in network switches 21 and 22 are provided on a one to one correspondence. For example, the first input port is associated with the first output port. The correspondence between the input ports and the output ports may be a general correspondence. The numbers of the input ports and the output ports in network switches 21 and 22 are not limited to "5", but may be any arbitrary natural numbers.

In the example shown in FIG. 2, among five ports included in each of network switches 21-1 and 22-1 to 22-4, ports 1 to 4 are connected in a downlink direction (direction from network switch 21-1 to network switches 22-1 to 22-4) in FIG. 1, and port 5 is connected in a uplink direction (direction from network switches 22-1 to 22-4 to network switch 21-1) of FIG. 1.

Next, constituent elements included in each of network switches 21 and 22 will be described. Since network switches 21 and 22 have the same configurations and the same capabilities, constituent elements included in network switch 22-1 will be described below, by way of example.

As shown in FIG. 2, network switch 22-1 includes input buffers 20'-1 to 201-5 (hereinafter collectively referred to as "input buffer 201"), output buffers 202-1 to 202-5 (hereinafter collectively referred to as "output buffer 202"), crossbar switch 203, crossbar controller 204, and multicast controller 205.

Input buffers 201-1 to 201-5 retain, decode and output packets which are input from the input ports of network switch 22-1. In the exemplary embodiment, input buffers 201-1 to 201-5 correspond to input ports 1 to 5, respectively.

Output buffers 202-1 to 202-5 retain packets which are output from crossbar switch 203, and output the retained packets to network switches 2'-1, 22-2 to 22-4 and calculation node group 1 from the output ports. In the exemplary embodiment, output buffers 202-1 to 202-5 correspond to output ports 1 to 5, respectively.

Under the control of crossbar controller 204, crossbar switch 203 performs an operation (routing) of transmitting the packets output from input buffers 201-1 to 201-5 to output buffers 202-1 to 202-5 specified by crossbar controller 204.

Crossbar controller 204 receives destination information decoded by input buffers 201-1 to 201-5 and controls routing of crossbar switch 203 according to the input destination information.

When multicast packets are input from input buffers 201-1 to 201-5, multicast controller 205 generates copies of the multicast packets and outputs the copies of the multicast packets to appropriate output buffers 202-1 to 202-5.

It is now assumed that the packet that is input from input buffer 201 to multicast controller 205 is a path setting command, described later. In that case, when setting a transfer path, multicast controller 205 sets a transfer destination (network switch 21 or 22) of the path setting command as a transfer source of the multicast packet. Multicast controller 205 also sets the transfer source (calculation node 10) of the path setting command as the transfer destination of the multicast packet. This multicast packet is a packet that is transmitted by the multicast communication using the set transfer path.

Figure 3:
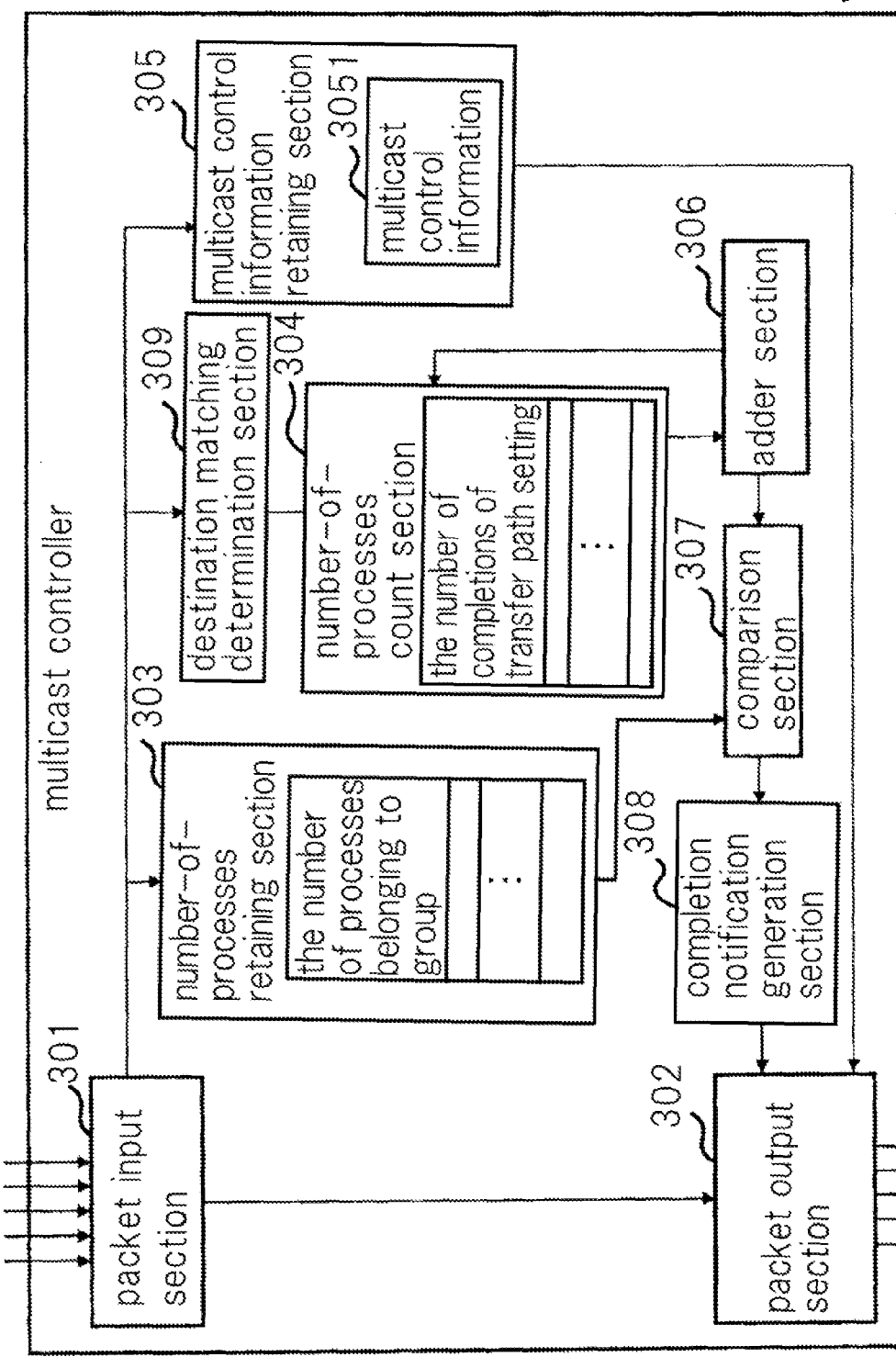
FIG. 3 is a diagram showing the configuration of a multicast controller shown in FIG. 2.

As shown in FIG. 3, multicast controller 205 includes packet input section 301, packet output section 302, number-of-processes retaining section 303, number-of-processes count section 304, multicast control information retaining section 305, adder section 306, comparison section 307, completion notification generation section 308, and destination matching determination section 309.

Packet input section 301 receives input of packets from input buffers 201-1 to 201-5 and outputs the input packets to packet output section 302. The packets that are input by packet input section 301 include multicast packets transmitted through multicast communication, path setting commands issued by calculation nodes 10, and the like. When the path setting command is transmitted from calculation node 10, packet input section 301 executes a "path setting command reception process", described later and receives the path setting command. Packet input section 301 also has the capability of notifying number of processes retaining section 303, number-of-processes count section 304, and multicast control information retaining section 305 of predetermined control information (for example, multicast ID, described below) stored in the received path setting command.

Packet output section 302 receives packets (such as the path setting command and multicast packets) from packet input section 301 or completion notification generation section n 308 and outputs the received packets to output buffers 202-1 to 202-5 shown in FIG. 2. Packet output section 302 also receives "multicast control information 3051", which is transfer path information for specifying the output destinations (transfer destinations) of the multicast packets, from multicast control information retaining section 305.

Number-of-processes retaining section 303 is comprised of registers that execute a "number of processes retaining process" and that retains "the number of processes belonging to group". The term "the number of processes belonging to group" as used herein refers to the number of processes belonging to each process group on calculation nodes 10 that execute multicast communication. The term "process group" as used herein corresponds to, for example, a communicator which is treated as a set of processes for performing communication in MPI. Number-of-processes retaining section 303 receives input of the multicast ID from packet input section 301 and outputs a register value (the number of processes belonging to group) that is specified by the multicast ID to comparison section 307.

Number-of-processes count section 304 is comprised of registers that execute a "number of processes counting process" and that retain register values related to "transfer path setting", which is a setting process of a transfer path of the multicast packets in the multicast communication. More specifically, number-of-processes count section 304 retains the number of completions of transfer path setting (hereinafter called "the number of completed path setting processes") with respect to the processes on calculation nodes 10 that perform the multicast communication. Number-of-processes counter 304 receives input of the multicast ID from packet input section 301 and outputs the register value (the number of completed path setting processes) specified by the multicast ID to adder section 306.

Multicast control information retaining section 305 executes a "multicast control information retaining process" and retains "multicast control information 3051", which is information for specifying the output port number of an output from which a copy of the multicast packets is output. When packet input section 301 receives the path setting command from a process on calculation nodes 10, multicast control information retaining section 305 executes the path setting process for the process. For this reason, the number of completed path setting processes that are counted by number-of-processes count section 304 is the same as the number-of-path setting commands that are received by network switch 22-1.

Multicast control information retaining section 305 also receives inputs from packet input sections 301-1 to 301-5 and outputs control signals (transfer path information) to packet output sections 302-1 to 302-5. Multicast control information retaining section 305 has a capability of identifying a packet input section which has input a packet from input buffer 201 (input port), among packet input sections 301-1 to 301-5.

Adder section 306, which is constituted by adders, executes an "addition process", and counts the number of completed path setting processes which is the number of transfer path settings of packets that multicast controller 205 has completed, based on updates of the register values retained by number-of-processes count section 304. Adder section 306 performs an addition process to "the number of completed path setting processes" retained by number-of-processes count section 304 and then overwrites the register values retained by number-of-processes count section 304 with the result of the addition process. Adder section 306 then outputs the addition result to comparison section 307.

Comparison section 307, which is constituted by a comparator, executes a "comparison process". Specifically, comparison section 307 receives as inputs values from adder section 306 and number-of-processes retaining section 303, compares the input value from adder section 306 and the input value from number-of-processes retaining section 303 with each other, and outputs the comparison result to completion notification generation section 308. When the comparison result reveals that both values are identical with each other, comparison section 307 determines that the path setting of the multicast communication has been completed. When it is determined that the path setting has been completed, comparison section 307 executes a "completion notification instruction process" and instructs completion notification generation section 308 to generate a "path setting completion notification" which is a packet for notifying completion of the path setting.

Completion notification generation section 308 executes a "completion notification generation process" and generates the "path setting completion notification" according to the instruction by the "completion notification instruction process" from comparison section 307. Completion notification generation section 308 also executes a "completion notification transmission process" and outputs the generated path setting completion notification to packet output section 302. As a result, the path setting completion notification is transmitted to calculation nodes 10.

Destination matching determination section 309 executes a "destination matching determination process" to determine whether or not the final destination of the path setting command indicated by the transfer destination information of the path setting command is identical with the network switch of the network. When it is determined that they are identical with each other, destination matching determination section 309 recognizes that the network switch of the network is the final transfer destination of the packet. Destination matching determination section 309 then notifies number-of-processes count section 304 of the determination result of the "final destination of path setting command" stored in the path setting command.

Destination matching determination section 309 also has a capability of determining, when the multicast communication is executed, whether or not the destination of the multicast packet transmitted from calculation nodes 10 is identical with the network switch. When it is determined that the destination is identical with the network switch, destination matching determination section 309 rewrites a "controller arrival bit" in the multicast packet with "1".

It is preferable that number-of-processes retaining section 303, number-of-processes counter 304, and multicast control information retaining section 305 are configured to be able to retain sets of information (one set of information includes the number of processes belonging to one group in FIG. 3, the number of completed one path setting processes in FIG. 3, and one bit sequence of FIG. 4, described below). In that case, it is assumed that each of the process groups on calculation nodes 10 that execute the multicast communication is assigned a number (hereinafter "multicast ID") for identifying the process group. This allows each process group to select information corresponding to the process group from the sets of information based on the multicast ID. This is because the process groups are able to simultaneously execute the multicast communication.

Next, the configuration of multicast control information retaining section 305 will be described in detail. As shown in FIG. 4, m bit sequences B1 to Bm with a length of five are registered in "multicast control information 3051" retained by multicast control information retaining section 305. Here, m sequences B1 to Bm are intended to allow setting a plurality of (m) transfer paths for multicast communications.

Multicast control information retaining section 305 specifies a specific bit sequence from among bit sequences B1 to Bm based on the multicast ID included in the path setting command transmitted from the calculation nodes 10. Five bits included in each of bit sequences 131 to Bm are associated with five output ports (output buffers 202-1 to 202-5 corresponding to the output ports), respectively. As described above, the input ports and the output ports included in the network switch are associated one to one. Therefore, multicast control information retaining section 305 can identify the bit in bit sequences 131 to Bm that is associated with the output port number corresponding to the input port number of the input port through which the path setting command is input from the outside.

Multicast control information retaining section 305 sets "1" to a bit in bit sequences B1 to Bm corresponding to the output port number of an output port from which the multicast packet is output. Multicast control information retaining section 305 sets "0" to bits corresponding to the output port numbers of output ports from which the multicast packet is not output. In the example of bit sequence B1 shown in FIG. 4, the output port (output port number "1") corresponding to the first bit is set for multicast packet transmission.

Figure 4:
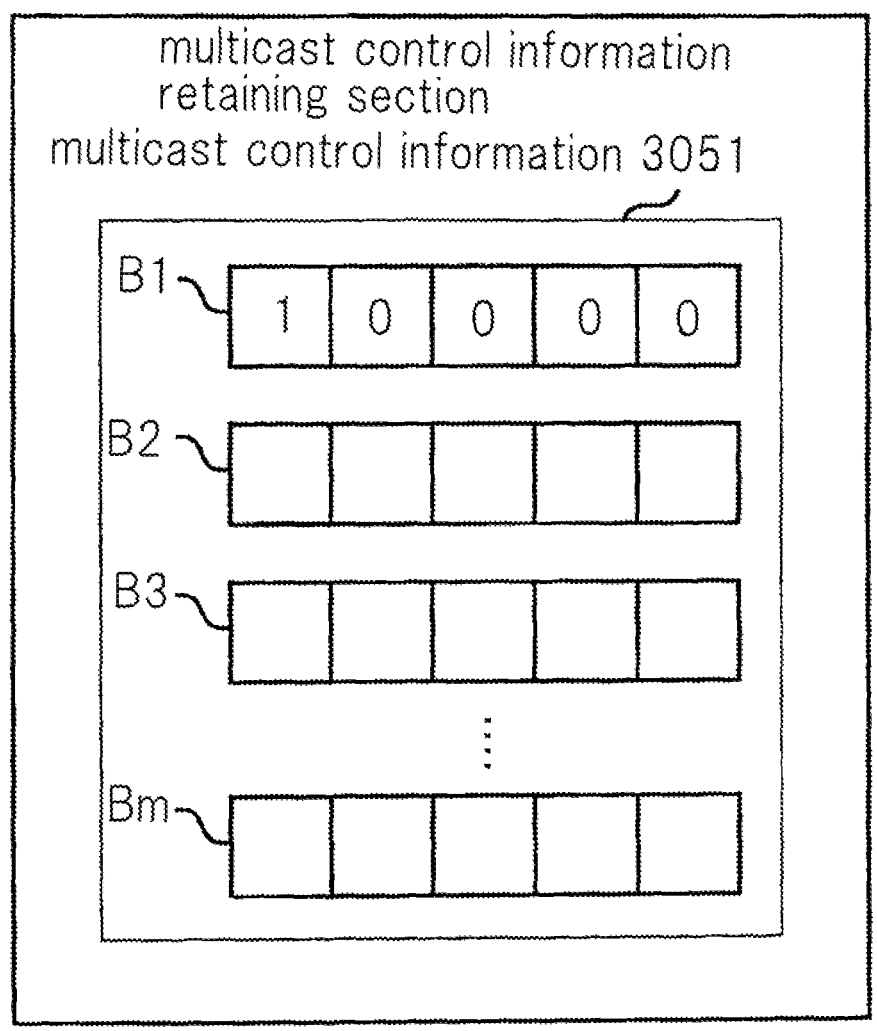
FIG. 4 is a diagram showing the configuration of a multicast control information retaining section shown in FIG. 3.

In the example shown in FIG. 4, the output destination of the multicast packets is indicated by the bit sequence including the same number of bits as the number of output ports included in network switches 21 and 22. However, the form of multicast control information 3051 is not particularly limited. For example, multicast control information 3051 may be a list in which output port numbers of output ports that are output destinations of the multicast packet are registered.

Figure 5:
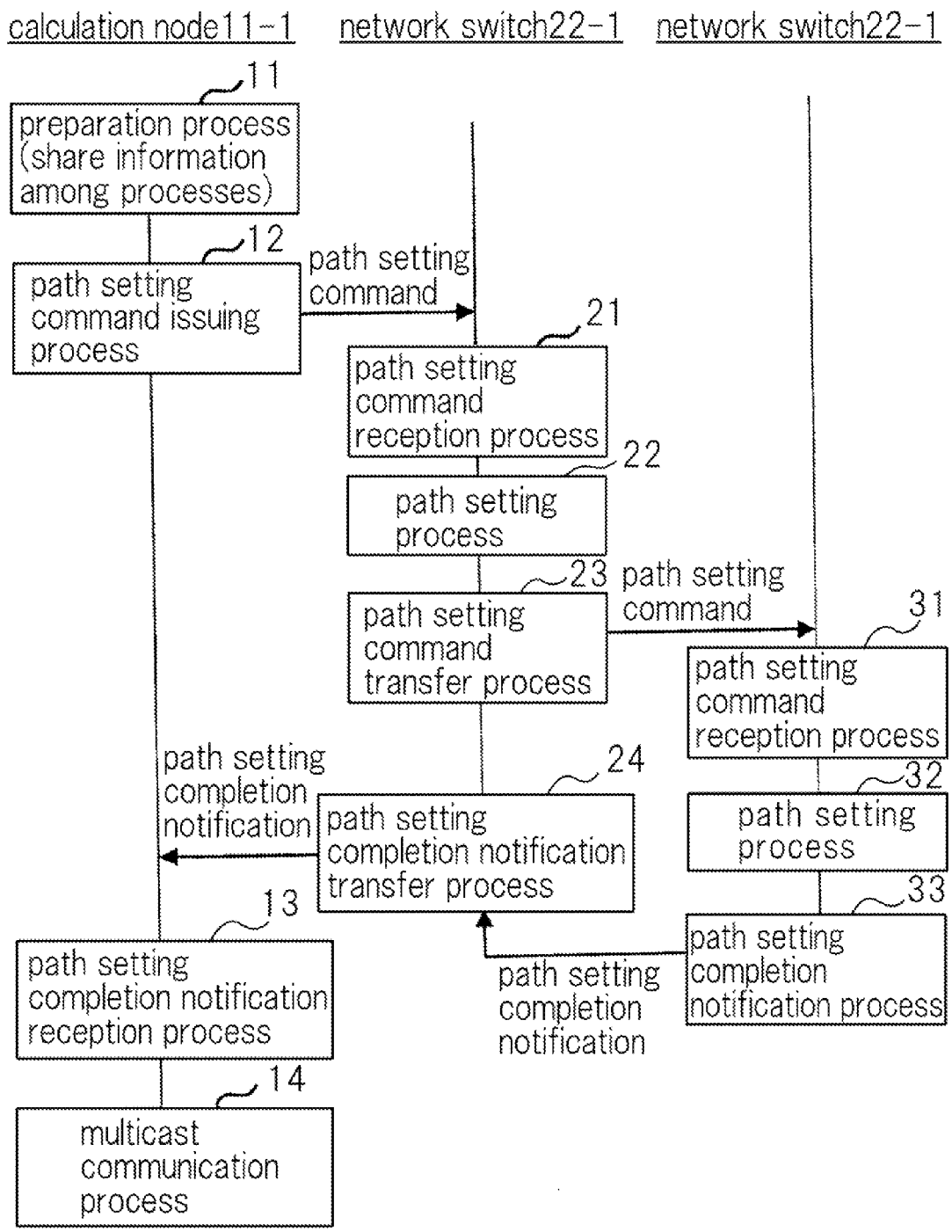
FIG. 5 is a diagram showing an operation sequence of a transfer path setting process and a multicast communication process for multicast communication in the present invention.

Next, an operation sequence of a "transfer path setting process" for setting a transfer path for multicast communication in the parallel computer system configured as described above will be described. As shown in FIG. 5, the operation sequences are executed among calculation node 10, network switch 21, and network switch 22.

In this "transfer path setting process", calculation node 10 executes a "preparation process" in step 11, a "path setting command issuing process" in step 12, a "path setting completion notification reception process" in step 13, and a "multicast communication process" in step 14.

In this "transfer path setting process", network switch 21 or 22 executes a "path setting command reception process" in step 21 or 31 and a "path setting process" in step 22 or 32. A "path setting command transfer process" in step 23, a "path setting completion notification process" in step 33, and a "path setting completion notification transfer process" in step 24 are executed depending on whether it is the final destination of the path setting command.

Outlines of the processes will be hereinafter described.

The "preparation process" in step 11 is executed in order for the processes in calculation nodes 10 belonging to a process group that executes the multicast communication to share in advance information, such as the "multicast ID" for identifying the process group and the number of processes belonging to each process group.

The "path setting command issuing process" in step 12 is executed in order for the processes of a process group in calculation nodes 10 that executes the multicast communication to issue the "path setting command" for instructing network switches 21 and 22 to set the transfer path. Details of the data structure of the "path setting command" will be described later.

The "path setting command reception process" in steps 21 or 31 is executed in order to receive in network switches 21 and 22 the "path setting command" transmitted from the processes of a process group in calculation nodes 10 through the "path setting command issuing process".

Figures 6, 7:
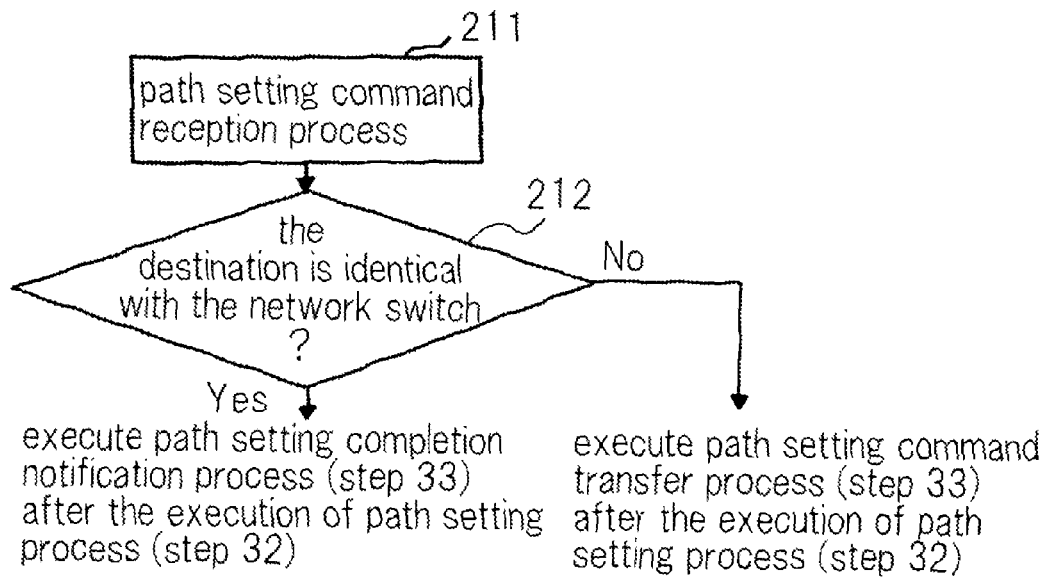
FIG. 6 is a flow chart showing a path setting command reception process shown in FIG. 5.
FIG. 7 is a diagram showing an example of a data structure of a path setting command.

As shown in FIG. 6, in the "path setting command reception process" in step 21, the "path setting command reception process" in step 211 and the "destination matching determination process" in step 212 are executed. The "path setting command reception process" in step 211 is executed by packet input section 301 to receive the path setting command. The "destination matching determination process" in step 212 is executed by destination matching determination section 309 to determine whether or not the final destination of the path setting command indicated by a "multicast control switch number" described later is identical with the network switch.

If the result of check in step 212 in FIG. 6 is No, and destination matching determination section 309 determines that the network switch is not the final destination, then the "path setting command transfer process" in step 23 is executed after the "path setting process" in step 22 is executed, as shown in FIG. 5. If the result of check in step 212 in FIG. 6 is Yes, and destination matching determination section 309 determines that the network switch of the network is the final destination, then the "path setting completion notification process" is step 33 is executed after the "path setting process" in step 32 is executed, as shown in FIG. 5.

Network switches 21 and 22 that have received the "path setting command" through the "path setting command reception process" execute the "path setting process" in step 22 or 32 shown in FIG. 5 based on the received "path setting command". In each of network switches 21 and 22, multicast controller 205 in each of network switches 21 and 22 sets multicast control information 3051 in accordance with the instruction of the path setting command received from calculation node 10.

The "path setting command transfer process" in step 23 is executed in order to transmit the "path setting commands" transmitted from the processes of the process group in calculation node 10 to the network switch of the final destination ("multicast control switch", described later).

The "path setting completion notification process" in step 33 is executed in order for network switch 21 or 22, which is the final destination of the path setting command, to notify calculation node 10, which has issued the path setting command, of the completion of setting of the path used for the multicast communication as a result of the completion of the "path setting process".

The network switch on the transfer path from the multicast control switch to calculation node 10 executes the "path setting completion notification transfer process" in step 24. As a result, network switch 21 or 22 relays the path setting completion notification transmitted by the multicast control switch and transfers the notification to the calculation node that has issued the path setting command.

The "path setting completion notification reception process" in step 13 is executed by the processes in the process group of calculation nodes 10. In the "path setting completion notification reception process", the process group receives the "path setting completion notification" transmitted from the network switch, which is a multicast control switch, through the "path setting completion notification process" in step 23. As a result, the processes in the process group that has received the notification recognize that the path setting of the multicast communication requested by the network through the transmission of the "path setting command" has been completed on the network switch, which is the final destination of the path setting command. Therefore, a multicast communication command for performing the multicast communication can be issued to the process group that has received the "path setting completion notification".

After the completion of the "path setting completion notification reception process" in step 13, the processes in the process group that has received the "path setting completion notification" executes the multicast communication by executing the "multicast communication process" in step 14 when the program instructs execution of the multicast communication. Once the path is set, the multicast communication for the process group can be executed a plurality of times by repeating the "multicast communication process".

Next, the processes in steps 11 to 14 by calculation nodes 10, the processes in steps 21 to 24 by network switch 22-1, and the processes in steps 31 to 33 by network switch 21-1 will be described in detail. In the following, by way of example, a process group consisting of five processes executes the multicast communication on the parallel computer system shown in FIG. 1. The five processes are operated on calculation nodes 11-1 to 11-4, 12-1 to 12-4, 13-1 to 13-4, and 14-1 to 14-4, respectively.

First, the "preparation process" in step 11 executed on calculation nodes 10 will be described. In the "preparation process" shown in FIG. 5, prior to the path setting of the multicast communication, the processes of the process group that execute the multicast communication share information indicative of (a) a multicast ID, (b) the number for specifying a network switch that controls the multicast communication (hereinafter referred to as "multicast control switch number"), and (c) the number of processes included in the process group (hereinafter referred to as "the number of processes belonging to group").

The "multicast ID" is "identification information" indicating a number for identifying the process group that operates on calculation nodes 10. In the following example, it is assumed that the multicast ID is "1".

The "multicast control switch number" is information for specifying a network switch that controls the multicast communication. The network switch specified by the "multicast control switch number" is hereinafter referred to as "multicast control switch". In the network having a tree structure, it is most efficient to specify the upper most network switch (network switch 21-1) shown in FIG. 9. For this reason, in this example, it is assumed that "network switch 21-1" is specified by the multicast control switch number. The multicast control switch number may be transfer path information for transferring the path setting command to the multicast control switch.

"The number of processes belonging to group" is the number of processes that belong to the process group with the "multicast ID" in calculation node 10. Since the "multicast ID" is given to the process group that executes the multicast communication, "the number of processes belonging to group" is "the number of multicast execution processes" indicative of the number of processes that participate in the multicast communication and that execute the multicast communication. In the following example, it is assumed that "the number of processes belonging to group" is five.

Thus, "preparation process" in step 11 has been completed.

Next, the "path setting command issuing process" in step 12 to be executed on the calculation node 10 will be described. In the "path setting command issuing process" in step 12, each process of the process group that executes the multicast communication in calculation node 10 issues a "path setting command". The issued path setting command is transferred to multicast controller 205 included in specific network switches 21 and 22 on the interconnection network 2 shown in FIG. 9.

The "path setting command" is a packet that includes a command for instructing multicast controller 205 included in network 21 or 22 to set the transfer path for multicast communication.

The path setting command also includes information that is shared between the processes that perform the multicast communication in the "preparation process". More specifically, as shown in FIG. 7, the path setting command includes the multicast ID (="1"), the multicast control switch number (="network switch 21-1"), and the number of processes belonging to group (="5"). The multicast control switch number is the "transfer destination information of path setting command", which is path information for transferring the path setting command to a multicast control switch that controls the multicast communication.

Next, the "path setting command reception process" in step 21 that is executed by network switches 21 and 22 will be described. In the "path setting command reception process" in step 21 shown in FIG. 5, network switches 21 and 22 receive a path setting command that is issued by the calculation node in the "path setting command issuing process". At this time, packet input section 301 in network switches 21 and 22 receives the path setting command from calculation node 10 or from another network switch that has transferred the path setting command received from calculation node 10.

Next, operation of the network switch when the path setting command issued by calculation node 10 is received will be described. In the following, as shown in FIG. 5, by way of example, operation of the network switch when network switch 22-1 or 21-1 has received the path setting command issued by calculation node 11-1 will be described. In this example, it is assumed that the path setting command issued by calculation node 11-1 is the path setting command shown in FIG. 7, and "network switch 21-1" is specified as the multicast control switch.

The operation of the network switch varies depending on whether or not the network switch is the final destination of the path setting command (whether or not the network switch is a multichannel control switch). For this reason, network switch 22-1 that is not the "multichannel control switch" will be described first.

Network switch 22-1 executes the "path setting command reception process" in step 211 shown in FIG. 6 in the "path setting command reception process" in step 21 shown in FIG. 5 and receives the path setting command issued by calculation node 1'-1. Subsequently, input buffer 201-1 in network switch 22-1 decodes the path setting command and supplies the command to multicast controller 205. Packet input section 301 included in multicast controller 205 extracts the multicast control switch number and the multicast ID from the path setting command that is supplied from input buffer 201-1.

Subsequently, destination matching determination section 309 executes the "destination matching determination process" in step 212 shown in FIG. 6 and determines whether or not the final destination of the path setting command indicated by the transfer destination information (multicast control switch number) in the path setting command is identical with network switch 22-1. In this example, the multicast control switch number denotes network switch 21-1, and network switch 22-1 is not the final transfer destination. Accordingly, destination matching determination section 309 determines that the network switch is not the final transfer destination. In this case, in switch 22-1, multicast controller 205 executes the "path setting process" in step 22 and then executes the "path setting command transfer process" in step 23.

Next, the "path setting process" in step 22 shown in FIG. 6 will be described. Multicast control information retaining section 305 updates multicast control information 3051 retained by multicast control information retaining section 305 to execute the "path setting process" in step 22. Multicast control information retaining section 305 sets, in the bit sequence specified by the multicast ID in the path setting command, the value of a bit that corresponds to the input port number of an input port that has received the path setting command, to "1". In this example, since the multicast ID indicates "1", "first bit sequence B1" shown in FIG. 4 is designated. Furthermore, assume that the input port number of an input port that has received the path setting command is "1". In this case, multicast control information retaining section 305 sets, in bit sequence B1 specified by the multicast ID, the value of the "bit corresponding to the first output port" that corresponds to input port number "1", to "1". Such an operation will be hereinafter referred to as a "bit setting operation".

After completion of the "path setting process" (bit setting operation), network switch 22-1 executes the "path setting command transfer process" in step 23. Packet input section 301 supplies the path setting command received by network switch 22-1 to output buffer 202-5 through packet output section 302. Output buffer 202-5 in network switch 22-1 executes the "path setting command transfer process" to transfer the path setting command to network switch 21-1 which is the final destination.

Next, operation of switch 21-1 which is the "final destination (multicast control switch) of path setting command" will be described. Upon receipt of the path setting command transferred from network switch 22-1 through the "path setting command reception process" in step 31, switch 21-1 supplies the path setting command decoded by input buffer 201-1 to multicast controller 205. Packet input section 301 in multicast controller 205 extracts the multicast control switch number and the multicast ID from the path setting command. Since the destination indicated by the extracted multicast control switch number (transfer destination information) is switch 21-1, network switch 21-1 that is currently referencing the transfer destination information is the final destination of the path setting command issued from calculation node 11-1.

In this case, destination matching determination section 309 included in network switch 21-1 determines that the result of the destination matching determination process in step 212 shown in FIG. 6 is Yes and that the network switch of the destination indicated by the transfer destination information is identical with network switch 21-1 and recognizes that the network switch is the final transfer destination. As a result, in network switch 21-1, multicast control information retaining section 305 executes the "path setting process" in step 32, and multicast control information retaining section 305 and completion notification generation section 308 execute the "path setting completion notification process" in step 33.

The operation of the "path setting process" by means of network switch 21-1 is the same as the bit setting operation executed in the "path setting process" by means of network switch 22-1. More specifically, in network switch 21-1, multicast control information retaining section 305 specifies "first bit sequence B1" specified by the multicast ID ("1" in the example) from multicast control information 3051. Furthermore, multicast control information retaining section 305 sets, in specified bit sequence B1, the value of a bit of the number of the output port (first bit) corresponding to the number of the input port (for example, "1") that has received the path setting command to, "1". As a result of the setting operation, the output port with output port number 1 included in network switch 21-1 is used when network switch 21-1 transfers the multicast packet to calculation node 11-1 that has issued the path setting command.

The "path setting completion notification process" in step 33 of network switch 21-1 is executed in the following manner. First, packet input section 301 notifies number-of-processes retaining section 303 of the multicast ID extracted from the path setting command. Number-of-processes retaining section 303 in turn outputs the value of the registers (the number of processes belonging to group) specified by the notified multicast ID to comparison section 307.

Packet input section 301 notifies number-of-processes counter 304 of the multicast ID. Number-of-processes counter 304 executes the "number-of-processes counting process" and outputs the value (the number of completed path setting processes) stored in the registers specified by the notified multicast ID to adder section 306.

Figure 8:
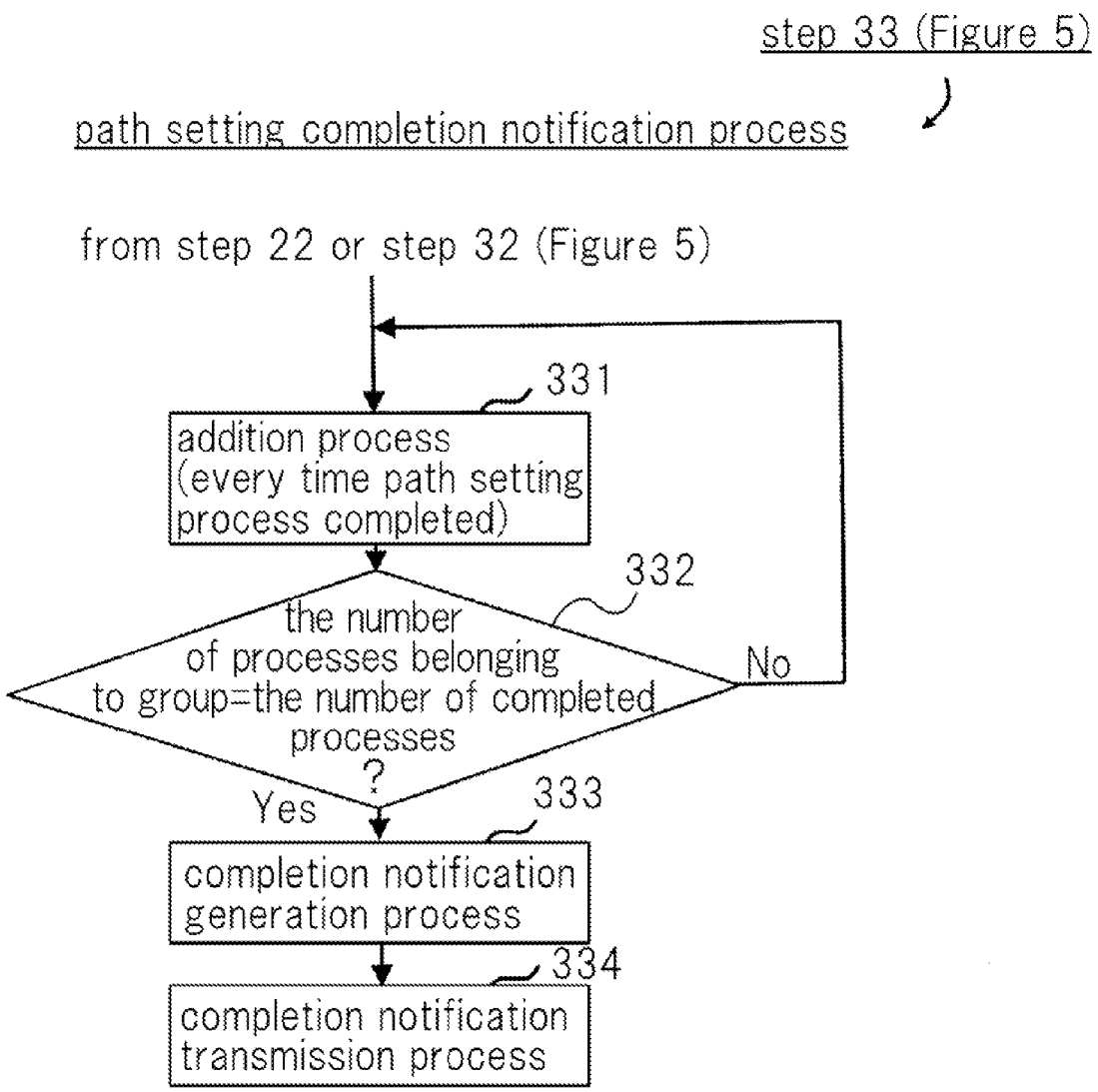
FIG. 8 is a flow chart showing a path setting completion notification process shown in FIG. 5.

As shown in FIG. 8, adder section 306 executes the "addition process" in step 331 every time multicast control information retaining section 305 sets one bit included in bit sequences B1 to Bm in multicast control information 3051. In the "addition process", adder section 306 adds 1 to the number of completed path setting processes, which is a value of the registers output from number-of-processes counter 304. Subsequently, adder section 306 overwrites number-of-processes counter 304 with the result of the addition and outputs the result of addition to comparison section 307.

Comparison section 307 executes the "comparison process" in step 332 to compare the value input from number-of-processes retaining section 303 (the number of processes belonging to group of the process group that performs the multicast communication on calculation node 10) with the value input from adder section 306 (the number of completed path setting processes after adder section 306 executed the addition process). If it is determined that the result of comparison in the "comparison process" in step 332 is Yes to reveal that the input values are identical with each other, this is equivalent to the fact that the path setting commands from all processes included in the process group that executes the multicast communication have arrived. At this time, comparison section 307 recognizes that the path setting for the multicast communication has been completed and instructs completion notification generation section 308 to issue the "path setting completion notification". On the other hand, if it is determined that the result of check in step 332 is No to reveal that the number of processes belonging to group is identical with the number of completed path setting processes, comparison section 307 recognizes that the path setting is not completed, and adder section 306 executes the process in step 331.

Figure 9:
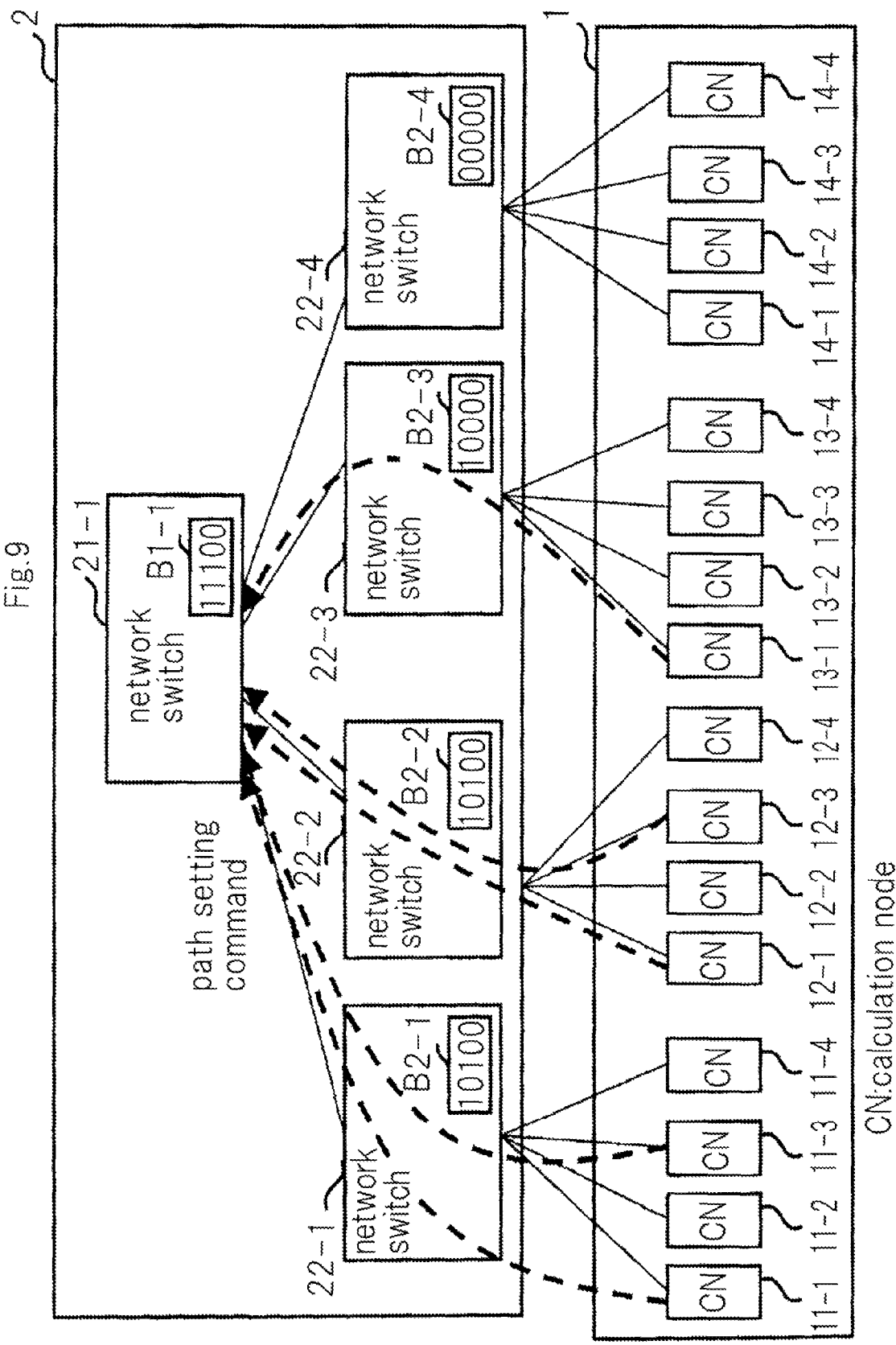
FIG. 9 is a diagram showing a flow of data between constituent elements in a "path setting process" of the parallel computer system.

When network switch 21-1 executes the "path setting process" in step 32, and the path setting commands reach switch 21-1 from all processes, the first bit sequence in multicast control information retaining section 305 in each of network switches 21-1 and 22-1 to 2-4 is set as B1-1 and B2-1 to B2-4 shown in FIG. 9. Since the value output from adder section 306 is identical with the value output from number-of-processes retaining section 303 in switch 21-1, comparison section 307 recognizes that the path setting has been completed. In this case, comparison section 307 executes the "completion notification instruction process" to instruct completion notification generation section 308 to issue the "path setting completion notification".

Completion notification generation section 308 generates path setting completion notification through the "completion notification generation process" in step 333 and outputs the generated path setting completion notification to packet output section 302. The multicast ID ("1" in this example) for specifying the process group that executes the multicast communication is described in the path setting completion notification.

Packet output section 302 in network switch 21-1 receives the path setting completion notification from completion notification generation section 308 that is generated through the "completion notification generation process". Packet output section 302 also receives the path information from multicast control information retaining section 305 that is set through the "path setting process". Packet output section 302 executes the "completion notification transmission process" to output a copy of the path setting completion notification using output buffer 202 (output port) that is specified by the path information. As a result, the path setting completion notification is transmitted to calculation node 11-1 in accordance with the transfer path. For example, in the example of FIG. 10, packet output section 302 in switch 21-1 outputs the path setting completion notification to the output ports (output port numbers 1 to 3) corresponding to the setting of "first bit sequence B1-1" in multicast control information 3051 specified by the multicast ID. Thus, the "path setting completion notification process" in step 33 has been completed.

In FIG. 5, as the transfer path for multicast communication, the path in the order of network switch 21-1, network switch 22-1, and calculation node 11-1 is set. Therefore, the "path setting completion notification transfer process" in step 24, which is a relay process by means of network switch 22-1, is executed.

Next, the "path setting completion notification transfer process" in step 24 will be described. Upon receipt of the "path setting completion notification" transmitted from network switch 21-1, network switch 22-1 causes packet input section 301 in multicast controller 205 to input the path setting completion notification. Packet input section 301 notifies multicast control information retaining section 305 of the multicast ID ("1" in this example) included in the path setting completion notification. Packet input section 301 also transfers the input path setting completion notification to packet output section 302. Packet output section 302 in network switch 22-1 outputs the packet to the port specified by the bits included in bit sequence B2-1 of FIG. 10 in multicast control information 3051. As a result, the "path setting completion notification" issued by network switch 21-1 is transmitted from network switch 22-1 to each process of the process group that operates on calculation node 11-1. The way to notify the processes of the completion of the path setting through the path setting completion command is arbitrary. For example, a general method can be used, such as setting a predetermined value to a memory corresponding to a specified address of calculation node 10 or to a specified register of calculation node 10 and reporting an interruption to calculation node 10.

Calculation node 11-1, which is the destination of the path setting completion notification, executes the "path setting completion notification reception process" in step 13, and each process of the process group receives the path setting completion notification. Thus, the "transfer path setting process" has been completed.

Next, the "multicast communication process" in step 14, in which calculation node 11-1 performs the multicast communication using the transfer path that is set by the series of "transfer path setting process", will be described. Five processes of the process group that execute the "multicast communication process" have capabilities of performing multicast communication. In the example described herein, calculation node 11-1 uses all five processes in the process group to perform the multicast communication.

It is assumed that the processes of the process group that operate on calculation node 11-1 have issued multicast packets. At this time, as shown in FIG. 11, the multicast packets transmitted from calculation node 11-1 are transferred to the multicast control switch that controls the multicast communication of the process group. The multicast control switch is specified by the "multicast control switch number" that is set in the "preparation process" in step 11. To this end, "network switch 21-1" is set to the destination information at the time calculation node 11-1 issues the multicast packet. In order to indicate that the multicast packets have not reached multicast control switch 21-1 in the initial state, "0" is set to the "controller arrival bit" in the multicast packet that is issued by calculation node 11-1.

In network switch 22-1 which is "not the multicast control switch", destination matching determination section 309 recognizes that the controller arrival bit in the multicast packet received from calculation node 11-1 is set to "0". Packet output section 302 in network switch 22-1 then transfers the multicast packet to the multicast control switch (network switch 21-1).

In network switch 21-1 which "is the multicast control switch", upon receipt of the multicast packet transferred from network switch 22-1, destination matching determination section 309 recognizes that the multicast packet has reached the final destination (network switch 21-1). Therefore, destination matching determination section 309 rewrites the controller arrival bit in the multicast packet with "1" and transfers the packet to packet input section 301 in multicast controller 205. Packet input section 301 notifies multicast control information retaining section 305 of the multicast ID and transfers the main body of the multicast packet to packet output section 302.

Furthermore, in network switch 21-1, multicast control information retaining section 305 reads out the bit sequence (path information) indicative of the output port which is set to the process group that has issued (calculation node 11-1) the multicast packet specified by the multicast ID, and transmits the read out path information to packet output section 302. In order to transmit the multicast packet using the transfer path that has been set, packet output section 302 outputs the multicast packet to output buffer 202 specified according to the path information. In the example shown in FIG. 11, the multicast packet transmitted from calculation node 11 is transmitted to network switches 22-1, 22-2, and 22-3 through network switch 21-1 which is a multicast control switch.

Each of network switches 22-1 to 22-3 recognizes that the controller arrival bit in the multicast packet transferred from network switch 21-1 is set to "1" to determine that the multicast packet has reached the multicast control switch. The multicast packet that has been determined to have reached the multicast control switch is then transferred to packet input section 301 in multicast controller 205. Packet input section 301 notifies multicast control information retaining section 305 of the multicast ID and transfers the multicast packet to packet output section 302.

Multicast control information retaining section 305 reads out the bit sequence (path information of the output port) specified by the multicast ID notified from packet input section 301, and supplies the path information to packet output section 302. Packet output section 302 outputs the multicast packet to any one of output buffers 202-1 to 202-5 specified by the supplied path information. As a result, network switch 22-1 transfers the multicast packet according to the transfer path set in the transfer path setting process. The transfer operation of the multicast packet is the same as the operation of transferring the setting completion command using the transfer path set in the transfer path setting process through the "path setting completion notification transfer process" in step 24.

Thus, the "multicast communication process" in step 14 is completed.

As described above, according to the parallel computer system of the present invention, network switches 21 and 22 specify at least one output port, set a transfer path of a copy of a packet input from an input port for the specified output port, determine whether or not the number of processes that have completed setting the transfer path is identical with the number processes retained in advance for executing multicast communication, and recognizes that the path setting of the multicast communication is completed when it is determined that the numbers are identical with each other.

This makes it possible to quickly set the destination and the transfer path in the multicast communication without recognizing the physical locations of the calculation node 10 connected to interconnection network 2.

Furthermore, according to the parallel computer system of the present invention, since setting of the destination and the transfer path in the multicast communication is quickly completed, the processing performance of the entire program used in the multicast communication capability can be improved.

Still furthermore, according to the parallel computer system of the present invention, in network switches 21-1 and 22, completion notification generation section 308 notifies calculation node 10, which has issued the path setting command, of the completion of the path setting of the multicast communication through multicast controller 205. As a result, the source that has issued the path setting command can recognize that the multicast communication can be executed.

Various changes may be made without departing from the scope of the present invention.

In the example of configuration shown in FIG. 2, after the multicast packets are input to multicast controller 205, multicast controller 205 outputs copies to output buffers 202. However, the method of performing the multicast communication within the network switch is not limited to this. For example, only control information in the packets may be input to multicast controller 205, and for the packets, copies of the packets may be output to output buffers 202 through crossbar switch 203.

In the example of operation, the number of processes belonging to the process group is set in advance in number-of-processes retaining section 303. However, each path setting command may retain the number of processes, and the output result of adder section 306 and the number of processes retained by the command are sequentially compared with each other to determine the completion of the path setting.

In the present invention, other than realizing the process in network switch 21-1 by using dedicated hardware, a program for realizing the capability may be recorded in a recording medium that is readable by a computer operating as network switch 21-1, and the computer may load and execute the program recorded in the recording medium. The recording medium readable by the computer operating as network switch 21-1 denotes a relocatable recording medium, such as a floppy disk (registered trademark), a magneto-optical disk, a DVD, and a CD, as well as an HDD and the like incorporated into the computer. The program recorded in the recording medium is loaded by, for example, a processor operating as multicast controller 205 included in the computer operating as network switch 21-1, and the same processes are executed under the control of the processor.

The processor that operates as multicast controller 205 executes the program loaded from the recording medium that has recorded the program. The program can be similarly applied to network switches 22-1 to 22-4.

The multicast control information retaining section in the network switch of the present invention may specify an output port for outputting the multicast packet from among the output ports based on an input port through which a path setting command, which is a command for instructing the multicast controller to execute the transfer path setting, is input.

The multicast control information retaining section in the network switch of the present invention may retain multicast control information that includes bits each associated with respective output ports, and may update values set to the bits to specify the output port corresponding to the updated bit as the output port for outputting the multicast packet.

The multicast control information retaining section in the network switch of the present invention may specify multicast control information that includes a bit to be updated based on a multicast ID.

The network switch of the present invention may further comprise a destination matching determination section that determines whether or not a destination indicated by transfer destination information in the path setting command is identical with the network switch to which the path setting command is input, when the path setting command is input to the input port. When the destination matching determination section has determined that the destination is identical with the network, the adder section may count the number of completed path setting processes.

The network switch of the present invention may further comprise the number-of-processes retaining section that retains the number of processes for executing the multicast communication included in the path setting command. The comparator may determine whether or not the number of completed path setting processes counted by the adder section is identical with the number of processes for executing the multicast communication that is retained by the number-of-processes retaining section.

The network switch of the present invention may further comprise a completion notification generation section that generates a path setting completion notification indicating that the transfer path setting is completed when the comparator recognizes that the transfer path setting of the multicast communication has been completed and that transfers the generated path setting completion notification to a transmission source of the path setting command that is input to the input port.

The completion notification generation section in the network switch of the present invention may transfer, the path setting completion notification through the multicast communication that is performed according to the transfer path set by the multicast controller.

When setting a transfer path using the path setting command, the multicast controller in the network switch of the present invention may set the transfer path such that the multicast packet is transferred in a direction opposite to the direction in which the path setting command is transferred on the interconnection network.

The multicast control information retaining process in the path setting method of the present invention may specify an output port for outputting the multicast packet from among the output ports based on an input port through which a path setting command, which is a command to instruct executing the transfer path setting in the multicast control process, is input.

The multicast control information retaining process in the path setting method of the present invention may retain multicast control information that includes bits each associated with respective output ports, and may update values set to the bits to specify the output port corresponding to the updated bit as the output port for outputting the multicast packet.

The multicast control information retaining process in the path setting method of the present invention may specify multicast control information that includes a bit to be updated based on a multicast ID.

The path setting method of the present invention may further comprise a destination matching determination process that determines whether or not a destination indicated by transfer destination information in the path setting command is identical with the network switch to which the path setting command is input, when the path setting command is input to the input port. When the destination matching determination process has determined that the destination is identical with the network, the adder process may count the number of completed path setting processes.

The path setting method of the present invention may further comprise the number-of-processes retaining process that retains the number of processes for executing the multicast communication included in the path setting command. The comparison process may determine whether or not the number-of-completed-path setting processes counted by the adder process is identical with the number of processes for executing the multicast communication that is retained by the number-of-processes retaining process.

The path setting of the present invention may further comprise a completion notification generation process that generates a path setting completion notification indicating that the transfer path setting is completed when the comparison recognizes that the transfer path setting of the multicast communication has been completed and that transfers the generated path setting completion notification to a transmission source of the path setting command that is input to the input port.

The completion notification generation process of the present invention may transfer the path setting completion notification through the multicast communication that is performed according to the transfer path set by the multicast control process.

In the path setting method of the present invention, when the transfer path is set in the multicast control process based on the path setting command, the transfer path may be set to transfer the multicast packet in the opposite direction from the direction in which the path setting command is transferred on an interconnection network.

In the multicast control information retaining procedure of the program of the present invention, the output port for outputting the multicast packet may be specified among the output ports based on an input port to which a path setting command, which is a command to instruct executing the transfer path setting in the multicast control procedure, is input.

In the multicast control information retaining procedure of the program of the present invention, multicast control information including bits associated with the output ports, respectively, may be retained, and a value set to the bits may be updated to specify the output port corresponding to the updated bit as the output port for outputting the multicast packet.

In the multicast control information retaining procedure of the program of the present invention, the multicast control information including the bit to be updated may be specified based on a multicast ID.

The program of the present invention may further comprise a destination matching determination procedure of determining whether a destination indicated by transfer destination information of the path setting command is identical with the network switch to which the path setting command is input, when the path setting command is input to the input port, wherein in the addition procedure, the number of completed path setting processes may be counted if it is determined in the destination matching determination procedure that the destination and the network switch are identical.

The program of the present invention may further comprise a number-of-processes retaining procedure of retaining the number of processes for executing the multicast communication included in the path setting command, wherein in the comparison procedure, whether the number of completed path setting processes counted in the addition procedure is identical with the number of processes for executing the multicast communication retained in the number of processes retaining procedure may be determined.

The program of the present invention may further comprise a completion notification generation procedure of generating a path setting completion notification indicating that the transfer path setting is completed if it is determined in the comparison procedure that the transfer path setting of the multicast communication is completed and of transferring the generated path setting completion notification to a transmission source of the path setting command input to the input port.

In the completion notification generation procedure of the program of the present invention, the path setting completion notification may be transferred by the multicast communication performed according to the transfer path set in the multicast control procedure.

In the program of the present invention, when the transfer path is set in the multicast control procedure based on the path setting command, the transfer path may be set to transfer the multicast packet in the opposite direction from the direction in which the path setting command is transferred on an interconnection network.

Although the present invention has been described with reference to the exemplary embodiment, the present invention is not limited to the exemplary embodiment. Various changes that can be understood by those skilled in the art can be made for the configurations and details of the present invention without departing from the scope of the present invention.

This application is the National Phase of PCT/JP2008/072511, filed Dec. 11, 2008, which claims the benefit of priority based on Japanese Patent Application No. 2008-028890 filed Feb. 8, 2008, the entire disclosure of which is hereby incorporated by reference.

The invention claimed is:

1. A network switch comprising a plurality of input ports and a plurality of output ports each associated with the respective input ports, wherein a multicast packet is output from an output port, the network switch comprising:

a multicast control information retaining section that specifies, from among said output ports, an output port from which the multicast packet is output, wherein said multicast control information retaining section specifies, from among said output ports, an output port from which the multicast packet is output, based on the input port from which the path setting command is input;

a multicast controller that performs transfer path setting for setting a transfer path of the multicast packet to the output port that is specified by said multicast control information retaining section;

an adder section that counts the number of completed path setting processes which is the number of processes for which said multicast controller has completed the transfer path setting;

a comparator section that determines whether or not the number of completed processes counted by said adder section is identical with the number of processes for executing the multicast communication, and that when it is determined that the numbers are identical with each other, recognizes that the transfer path setting of the multicast communication has been completed; and a completion notification generation section that generates a path setting completion notification indicating that the transfer path setting is completed when the comparator section recognizes that the transfer path setting of the multicast communication has been completed, and that transfers the generated path setting completion notification to a transmission source of the path setting command that is input to the input port.

2. The network switch according to claim 1, wherein said multicast control information retaining section retains multicast control information that includes a plurality of bits each associated with the respective output ports, updates the values set to the bits, and specifies the output port corresponding to the updated bit as an output port from which the multicast packet is output.

3. The network switch according to claim 2, wherein said multicast control information retaining section specifies multicast control information that includes a bit to be updated, based on a multicast ID.

4. The network switch according to claim 1, wherein it further comprises a destination matching determination section that determines whether or not a destination indicated by transfer destination information in the path setting command is identical with the network switch to which the path setting command is input, when the path setting command is input to the input port, and wherein when said destination matching determination section has determined that the destination is identical with the network switch, said adder section counts the number of completed path setting processes.

5. The network switch according to claim 1, wherein it further comprises a number-of-processes retaining section that retains the number of processes for executing the multicast communication included in the path setting command, and wherein said comparator section determines whether or not the number of completed path setting processes counted by said adder section is identical with the number of processes for executing the multicast communication that is retained by said number-of-processes retaining section.

6. The network switch according to claim 1, wherein said completion notification generation section transfers the path setting completion notification through the multicast communication that is performed according to the transfer path set by said multicast controller.

7. A path setting method in a network switch comprising a plurality of input ports and a plurality of output ports each associated with the respective input ports, wherein a multicast packet is output from an output port, the method comprising:

a multicast control information retaining process that specifies, from among said output ports, an output port from which the multicast packet is output, wherein said multicast control information retaining process specifies, from among said output ports, an output port from which the multicast packet is output, based on the input port from which the path setting command is input;

a multicast control process that performs transfer path setting for setting a transfer path of the multicast packet to the output port that is specified by said multicast control information retaining process;

an addition process that counts the number of completed path setting processes which is the number of processes for which said multicast control process has completed the transfer path setting;

a comparison process that determines whether or not the number of completed processes counted by said addition process is identical with the number of processes for executing the multicast communication, and that when it is determined that the numbers are identical with each other, recognizes that the transfer path setting of the multicast communication has been completed; and a completion notification generation process that generates a path setting completion notification indicating that the transfer path setting is completed when the comparison process recognizes that the transfer path setting of the multicast communication has been completed, and that transfers the generated path setting completion notification to a transmission source of the path setting command that is input to the input port.

8. The path setting method according to claim 7, wherein said multicast control information retaining process retains multicast control information that includes a plurality of bits each associated with the respective output ports, updates the values set to the bits, and specifies the output port corresponding to the updated bit as an output port from which the multicast packet is output.

9. The path setting method according to claim 8, wherein said multicast control information retaining process specifies multicast control information that includes a bit to be updated, based on a multicast ID.

10. The path setting method according to claim 7, wherein it further comprises a destination matching determination process that determines whether or not a destination indicated by transfer destination information in the path setting command is identical with the network switch to which the path setting command is input, when the path setting command is input to the input port, and wherein when said destination matching determination process has determined that the destination is identical with the network switch, said addition process counts the number of completed path setting processes.

11. The path setting method according to claim 7, wherein it further comprises a number-of-processes retaining process that retains the number of processes for executing the multicast communication included in the path setting command, and wherein said comparison process determines whether or not the number of completed path setting processes counted by said addition process is identical with the number of processes for executing the multicast communication that is retained by said number-of-processes retaining process.

12. The path setting method according to claim 7, wherein said completion notification generation process transfers the path setting completion notification through the multicast communication that is performed according to the transfer path set by said multicast control process.

13. A non-transitory computer-readable storage medium storing a computer program for causing a computer in a network switch to perform:

a multicast control information retaining procedure that specifies, from among output ports each associated with the respective input ports that are possessed by a network switch, an output port from which the multicast packet is output, wherein said multicast control information retaining procedure specifies, from among said output ports, an output port from which the multicast packet is output, based on the input port from which the path setting command is input;

a multicast control procedure that performs transfer path setting for setting a transfer path of the multicast packet to the output port that is specified by said multicast control information retaining procedure;

an addition procedure that counts the number of completed path setting processes which is the number of processes for which said multicast control procedure has completed the transfer path setting;

a comparison procedure that determines whether or not the number of completed processes counted by said addition procedure is identical with the number of processes for executing the multicast communication, and that when it is determined that the numbers are identical with each other, recognizes that the transfer path setting of the multicast communication has been completed; and a completion notification generation procedure that generates a path setting completion notification indicating that the transfer path setting is completed when the comparison procedure recognizes that the transfer path setting of the multicast communication has been completed, and that transfers the generated path setting completion notification to a transmission source of the path setting command that is input to the input port.

14. The program according to claim 13, wherein said multicast control information retaining procedure retains multicast control information that includes a plurality of bits each associated with the respective output ports, updates the values set to the bits, and specifies the output port corresponding to the updated bit as an output port from which the multicast packet is output.

15. The program according to claim 14, wherein said multicast control information retaining procedure specifies multicast control information that includes a bit to be updated, based on a multicast ID.

16. The program according to claim 13, wherein it further comprises a destination matching determination procedure that determines whether or not a destination indicated by transfer destination information in the path setting command is identical with the network switch to which the path setting command is input, when the path setting command is input to the input port, and wherein when said destination matching determination procedure has determined that the destination is identical with the network switch, said addition procedure counts the number of completed path setting processes.

17. The program according to claim 13, wherein it further comprises a number-of-processes retaining procedure that retains the number of processes for executing the multicast communication included in the path setting command, and wherein said comparison procedure determines whether or not the number of completed path setting processes counted by said addition procedure is identical with the number of processes for executing the multicast communication that is retained by said number-of-processes retaining procedure.

* * * * *